INVENTOR
KARL ROKITANSKY

United States Patent Office 3,681,199
Patented Aug. 1, 1972

3,681,199
PROCESS OF PRODUCING YEAST OF LOW PLASTICITY AND HIGH SOLIDS CONTENT
Karl Rokitansky, Vienna, Austria, assignor to Patent-auswertung Vogelbusch Gesellschaft m.b.H., Vienna, Austria
Continuation-in-part of application Ser. No. 493,530, Oct. 6, 1965. This application Apr. 1, 1970, Ser. No. 21,977
Claims priority, application Austria, Oct. 7, 1964, 8,563/64
Int. Cl. C12c 11/30
U.S. Cl. 195—98      7 Claims

ABSTRACT OF THE DISCLOSURE

Yeast of increased dry solid content, reduced plasticity, and high stability is produced by allowing urea or glycerol to act upon a yeast suspension for a short period of time so as to cause effusion of intracellular water from the yeast cells and to yield cytorrhyzed, i.e. shrunken cells. Immediately thereupon the cytorrhyzed yeast is filtered on suction filters, filter presses, centrifuges, or other conventional separating devices. The filtered yeast is allowed to stand to cause re-absorption of extracellular water containing residual urea or glycerol and thus yields yeast of the above mentioned improved properties. Other osmotically active compounds are not suitable for this process and do not cause reduction of the plasticity.

CROSS-REFERENCE TO RELATED APPLICATION

The present application is a continuation-in-part of application Ser. No. 493,530, filed Oct. 6, 1965, and entitled "Process of Producing Yeast and the Like Cell Material and Product" now abandoned.

BACKGROUND OF THE INVENTION (1) Field of the invention

The present invention relates to a process of producing yeast and more particularly to a process of producing yeast of low plasticity and increased dry solid content.

(2) Description of the prior art

U.S. Pat. No. 2,947,668 of Ernest Kuestler and Karl Rokitansky describes a process which has for its object to dehydrate a yeast suspension by means of suction filters of known type, i.e. in continuous operation, and thus to produce a yeast product which is sufficiently dry and is distinguished over other known yeast products by its increased dry solid content and an improved, i.e. reduced plasticity, by its improved stability and keeping qualities, and by its better leavening power and baking strength. This known process consists in treating an aqueous suspension of the cell material, for instance, of yeast cream, with an osmotically active compound, thereby causing exudation of intracellular water from and cytorrhysis of the cells. The suspension of the thus cytorrhyzed cells is applied to a suction filter, preferably a rotary drum suction filter. The osmotically active compound which is present in the extracellular water, remains in the filter cake. Its amount depends on the pressure difference applied to the suction filter. According to Pat. No. 2,947,668 it is displaced in the layer of the cytorrhyzed cells formed on the filter by a liquid of lower osmotic pressure, preferably by water. Said displacement of extracellular water containing the osmotically active compounds, i.e. washing of the filter cake on the filter is effected in such a manner that displacement or washing is discontinued before complete reabsorption of the displacing water by the cells in the form of intracellular water takes place. The layer of cell material freed by such washing from the osmotically active compounds is further exposed to the action of the difference in pressure prevailing on the suction filter. Thereby, the extracellular water content decreases below the value corresponding to and attainable by said difference in pressure because it is partly reabsorbed by the cells and thus enters the cells as intracellular water. The term "extracellular water" as used in said patent and hereinafter in the present specification and claims defines the amount of water in yeast and other cell material which is present outside the cells. With yeast suspension, or yeast cream, said extracellular water is the water or, respectively, the dilute wort solution wherein the yeast cells swim. With filter-pressed or suction-filtered and subsequently shaped and molded yeast, said extracellular water is that amount of water which is present in the narrow capillary interstices formed by the more or less tightly accumbent cells.

The term "intracellular water" as used in said patent and hereinafter in the present specification and claims defines the amount of water which is present within the cells themselves. The amount of intracellular water can be varied as explained hereinbefore by subjecting the cells, for instance, the yeast cells to the action of osmotically active compounds. When placing the cells into a solution, the osmotic pressure of which is higher than the osmotic pressure of the cell sap or juice, water or, respectively, liquid exudes from the interior of the cells into the solution wherein the cells are suspended. This phenomenon is called "cytorrhysis" or cell contraction (see S. Windisch and C. Enders in "Die Brauwelt," 1946, pages 151 to 220).

The total water content of the cell material such as yeast is the sum of extracellular water and intracellular water.

It is a disadvantage of this known process that the desired decrease in plasticity and simultaneous increase in dry solid content are difficult to attain in a simple manner. Special care must be taken to avoid any excessive washing of the cell material in a comparatively narrow zone of the suction filter area; i.e. complete reabsorption of water by recytorrhysis must be avoided during the displacement step, i.e. during washing of the cell material layer. Otherwise the cells would not be able to reabsorb extracellular water and the desired decrease in plasticity would not be achieved.

Kuestler et al. compare in U.S. Patent No. 2,947,668 a yeast treated with the osmotically active compound and filtered but removed from the filter without washing and found that the dry solid content is considerably increased by the treatment with the osmotically active compound. However, the plasticity of such a filter but unwashed yeast treated with an onmotically active compound is quite high and as high as that of yeast to which no osmotically active agent had been added. Thus addition of the osmotically active agent causes merely reduction of the intracellular water content of the yeast and hence an increase in its dry content but does not reduce its extra cellular water content and hence does not decrease its plasticity (see column 10, lines 3 to 6). Thus, according to Kuestler et al. mashing of the yeast treated with an osmotically active compound is an essential feature in producing a yeast of a high solid content and a low plasticity. The washing step, however, requires a considerably increased filter area, i.e. the output of filtered yeast per unit of filter area is considerably reduced when producing a yeast of a high solid content and a low plasticity according to Kuestler et al.

SUMMARY OF THE INVENTION

It is one object of the present invention to provide a simple and effective process of producing yeast of increased dry solid content and reduced plasticity which process is free of the above-mentioned disadvantage of requiring careful regulation of the displacement step and a considerable filter area.

Another object of the present invention is to provide a novel and valuable dry yeast product of a high dry solid content, of low plasticity, of improved stability and storability, of better leavening power and baking strength than heretofore possible, said product having other valuable properties distinguishing the same over the products obtained according to said U.S. Patent No. 2,947,668.

Other objects of the present invention and advantageous features thereof will become apparent as the description proceeds.

The process which yields yeast of increased dry solid content, low plasticity, and high stability consists in principle in proceeding as described by Kuestler et al. in Patent No. 2,947,668, namely in admixing to a yeast suspension an osmotically active compound, allowing said compound to act on the yeast, and filtering or centrifuging the cytorrhyzed yeast cells to remove therefrom exuded intracellular water and excess extracellular water. It differs, however, from said Kuestler et al. process by the following features:

(a) Of the many osmotically active compounds which can be used according to Kuestler et al., only two, namely urea or glycerol can be used in the improved process according to the present invention. For only these two compounds are capable of being absorbed by the yeast cells.

(b) Urea or glycerol are allowed to act on the yeast suspension for a short period of time only, namely for a period not substantially exceeding the time required for causing exudation of intracellular water from and cytorrhysis of the yeast cell. Such cytorrhysis is completed within about 5 seconds to about 2 minutes. It is not possible to add the osmotically active compound to a large batch of yeast suspension and to allow said batch to stand for a prolonged period of time before filtration as this can be done when proceeding according to Kuestler et al.; for thereby re-absorption of the exuded intracellular water together with part of the osmotically active compound will take place. Thus only relatively small amounts of the yeast suspension can be subjected to the action of the osmotically active agent before filtration. This is also in contrast to Kuestler et al.'s procedure.

(c) The thus cytorrhyzed yeast is immediately thereafter filtered or centrifuged in order to remove the exuded intracellular water and excess extracellular water from the yeast. Kuestler et al. suggest immediate filtration but state that it is also possible to keep and store the cytorrhyzed yeast cream for several days.

(d) After filtration or centrifuging the cytorrhyzed yeast, the filtered or centrifuged yeast is not washed as in the Kuestler et al. process but is allowed to stand before use for a period of time sufficient to cause re-absorption of extracellular water and of urea or glycerol by the yeast cells to replace the exuded intracellular water removed by filtration. In contrast thereto according to Kuestler et al. no osmotically active compound enters the yeast cells because it is washed out and removed from the extracellular water. As a result of storing the filtered yeast before use according to the present invention, the extracellular water content and thus the plasticity of the yeast is considerably reduced while its dry solid content remains substantially unchanged. The filtered yeast must be stored according to the present invention for at least 4 hours and preferably 24 hours because that much time is at least required to substantially complete reabsorption of the extracellular water.

In other words, the process according to the present invention consists in adding specific osmotically active compounds, namely urea or glycerol, to the yeast suspension and especially to yeast cream. Said compounds are capable of being adsorbed by the yeast cells and do not cause significant fermentation. When using such specific osmotically active compounds and allowing them to act on the yeast cell suspension for a relatively short period of time, a predetermined concentration of said compounds in the extracellular water is established.

After thus establishing the desired osmotic pressure in the extracellular water, shrunken yeast cells are obtained. Immediately thereafter, i.e. within 5 seconds to 2 minutes after addition of said specific, osmotically active compounds the extracellular water and exuded intracellular water are removed to a considerable extent by means of any conventional separating device such as filter presses, centrifuges, or suction filters. The resulting filtered cytorrhyzed yeast which is free of excess extracellular water and part of the intracellular water is then further exposed for a prolonged period of time, i.e., for at least 4 hours to the action of the remaining extracellular water still containing said specific osmotically active compound.

When using other osmotically active compounds than urea or glycerol, a cytorrhyzed yeast material is obtained the cells of which retain their shrunken condition and do not re-absorb extracellular water on storage. Thereby, the extent of the cell shrinkage depends on the concentration of the osmotically active compound remaining in the extracellular water which is not removed by filtration or the like. In contrast thereto, when using urea or glycerol there is also obtained a cytorrhyzed yeast cell material immediately after removal of the cell material from the separating device, for instance, the suction filter. The degree of shrinkage in this cytorrhyzed yeast cell material depends primarily upon the concentration of the specific, osmotically active compound which remains in the residual extracellular water. However, this shrunken state of the cytorrhyzed yeast cell material changes during storage following the separation step due to the fact that the cells re-absorb at least part of the specific osmotically active compound present in the remaining extracellular water. By absorption of the specific, osmotically active compounds urea or glycerol by the yeast cells, the osmotic conditions within the cells are changed considerably. The yeast cells exhibit an increasing osmotic pressure in their interior. At the same time, the osmotic pressure of the extracellular water decreases due to the decreasing content of the specific, osmotically active compound present therein. As a result thereof, extracellular water also diffuses into the yeast cells, the extent of diffusion being proportional to the amount of specific, osmotically active compound absorbed therefrom. Due thereto the intracellular water content of the yeast cell material after removal from the separating device and storage for at least 4 hours increases and its extracellular water content decreases. This results in a considerable reduction in plasticity of the yeast cell material. After storing the thus treated yeast cell material for at least 4 hours, a product of the desired low degree of plasticity is obtained. In this process the extracellular water is transformed into intracellular water, so that the total water content of the yeast cell cake after filtration remains unchanged and the dry solid content of the treated material remains the same as in the material formed on the filter depending on the vacuum or the pressure applied thereto.

The process of the present invention, according to which a yeast with an increased dry solid content is obtained thus is based on the action of the specific osmotically active compounds urea or glycerol upon the filtered yeast cell material and on the separation of the osmotically active extracellular water from the cytorrhyzed yeast cells depending on the separating force (vacuum filtration, centrifugal power) of the separating device as described in the above mentioned U.S. Patent No. 2,947,668. It differs therefrom, however, as stated hereinabove.

(a) By using a specific, osmotically active compound, namely urea or glycerol, which is absorbed by the yeast cells without causing significant fermentation;

(b) By allowing said specific osmotically active compound to act for a short time only on the yeast cell material before separating removable exuded intracellular water and excess extracellular water from the thus treated yeast cell material; and (c) By further exposing the separated yeast cell material for a prolonged period of time to the action of the remaining extracellular water containing residual amounts of the specific, osmotically active compound which thereby enters the yeast cells due to the difference in osmotic pressure as intracellular water.

A highly viable yeast of superior properties is obtained.

The yeast to be treated according to the present invention may be a yeast suspension and especially yeast cream.

As stated above, the only specific osmitically active compounds which can be used in this process are urea or glycerol.

These specific osmotically active compounds are readily water-soluble and substantially non-toxic, colorless, and odorless. They do not react with the yeast cell components and the cell membrane. They do not cause any substantially fermentation on contact with the yeast. They do not cause foaming and their solutions do not have the tendency to foam. On contact therewith yeast cream does not exhibit budding and, if at all, only a slight increase in gas formation.

According to another embodiment of the present invention it is also possible first to partly or substantially completely free the cell material of its excess extracellular water content before subjecting it to the action of urea or glycerol for a short period of time and then proceeding according to the present invention.

By the term "a short period of time" designating the duration of the action of urea or glycerol, there is understood the time interval which is required for the osmotically active compound added to the extracellular water to cause effusion of intracellular water from the yeast cells and to yield cytorrhyzed, i.e. shrunken yeast cells. This period of time must not be exceeded substantially. For when using such specific, osmotically active compounds as urea or glycerol, absorption of said compounds by the yeast cells takes place simultaneously with cytorrhysis of the cells—although at a relatively slower rate.

When allowing the extracellular water containing said specific, osmotically active compounds to remain in contact with or to act upon the yeast cell material for too long a period of time than necessary to just achieve the desired cytorrhysis before separating that part of the extracellular water which can be separated therefrom by means of a separating device, the favorable effect achieved by the process of the present invention, such as the reduction in plasticity, is not fully or not at all obtained.

Thus, in practical operation, it is advisable to contact the yeast cell material, for instance, the yeast cell suspension with urea or glycerol only for a short period of time or, respectively, immediately before separation of the removable portion of the extracellular water. It is an especially preferred procedure to limit the time of the action of the osmotically active compound, i.e. the time between the increase of the osmotic pressure in the extracellular liquid and the removal of the extracellular water by means of a separating device, to seconds or minutes. The time interval between addition of urea or glycerol to the yeast cell material and its filtration is between about 5 seconds and about 2 minutes, preferably between 20 seconds and 1 minute.

It is preferred, according to the present invention, to add between about 0.1% and about 5.0%, by weight, preferably between about 0.3% and about 2.0%, by weight, of urea or glycerol to 100 l. of the yeast cell suspension, for instance, of yeast cream. Of course, as explained above, larger or smaller amounts may also be added to achieve the same desired results. The smallest possible amount of urea or glycerol to achieve a predetermined desired effect will be required when using, as starting material, yeast suspensions, for instance, yeast cream of as high a cell concentration as possible and of a low content of extracellular water removable, for instance, by filtration at a pressure of 700 mm. Hg. Urea is preferably used in its solid form. However, it is also possible to use more or less concentrated urea solutions.

The yeast cell material, after removal of a portion of the extracellular water by suction filtration or by centrifuging is exposed according to the present invention to the action of the remaining extracellular water containing residual urea or glycerol, by eliminating the washing step of the process of U.S. Patent No. 2,947,668 after the treatment with said specific, osmotically active compound.

The resulting viable yeast cell material obtained according to the process of the present invention differs from an untreated yeast cell material neither in its color, nor in its odor. The taste of the obtained yeast cell material is not unpleasantly altered. When using urea there may arise a slightly cool and strong taste, whilst when using glycerol the taste may be slightly sweet. This process is of special value in the manufacture of packaged small yeast bricks in which the yeast undergoes further drying as well as in the manufacture of yeast to be shipped under difficult climatic conditions.

The fact that the packaged yeast bricks treated according to the present invention undergo further drying, i.e. transformation of extracellular water into intracellular water during storage, results in a considerably improved stability and keeping quality. The yeast shows a considerably reduced tendency to become moldy than heretofore produced yeast.

The process according to the present invention has the further important advantage that the yeast output per hour is considerably increased because that part of the surface of the rotary filter which heretofore was required for washing and displacing the extracellular liquid in the filter cake can now additionally be used as suction zone for filtering the cytorrhyzed yeast. As a result thereof a thicker yeast layer may be allowed to deposit on the filter and, thus, the filtering capacity per hour is considerably increased. This increase in output over the Kuestler et al. process which includes the washing step, amounts to between 30% and 40%. For instance, while when following the Kuestler et al. process 2200 kg. of yeast are produced on an 8 sq. m. rotary filter, the output amounts to 3000 kg. when proceeding according to the present invention, using urea or glycerol as osmotically active agents, filtering the treated yeast immediately after cytorrhysis is completed, and storing the filtered yeast.

BRIEF DESCRIPTION OF THE DRAWINGS

The attached drawings will facilitate an understanding of the present invention taken in connection with the following more detailed description and the examples.

In said drawings the curve in FIG. 1a represents the change in plasticity of unwashed yeast 24 hours after filtration whereby the yeast cream was treated according to the present invention for a short time (2 minutes) only with various amounts of urea before the treated yeast cream was filtered, while the curve illustrated in FIG. 1b represents the change in plasticity of unwashed filtered yeast obtained in the same manner whereby, however, various amounts of urea are allowed to react with the yeast for 24 hours before filtration. The curve illustrated in FIG. 2a represents the change in plasticity of unwashed filtered yeast obtained by short time action of glycerol while the curve in FIG. 2b represents the change in plasticity by long time action of glycerol. The curve in FIG. 3a represents the change in plasticity of unwashed filtered yeast obtained by short time action of sodium chloride and the curve in FIG. 3b represents the change in plasticity by long time action of sodium chloride. The curves in FIG. 4 illustrate the reduction in plasticity of yeast treated with urea according to the present invention and the curves in FIG. 5 illustrate the reduction in plasticity of yeast treated with glycerol according to the present invention.

In FIGS. 1a, 1b, 2a, 2b, 3a, and 3b the ordinate indicates the depth of penetration in mm. of a standard indentator weight into the yeast bricks which were shaped under the same conditions, whereby a conventional plasticity measuring apparatus was used. The abscissa in these figures indicates the amount in kg. of the osmotically active agent added to 100 l. of a yeast cream with about 18% of yeast solids.

In FIGS. 4 and 5 the ordinate also indicates the depth of penetration in mm. while the abscissa indicates the time in hours after completion of the filtration and brick formation.

The following examples serve to illustrate the process according to the present invention without, however, limiting the same thereto.

EXAMPLE 1

6 portions of 100 l. each of yeast cream are separated from a sample of 5,000 l. of yeast cream, containing yeast of like characteristics.

The first portion is immediately brought on a vacuum rotary drum without pretreatment with urea and is filtered under a pressure of 700 mm. Hg without washing the yeast on the filter. The filtered yeast is removed from the filter and yeast bricks of one half kg. each are formed.

The second portion of 100 l. of yeast cream is mixed with 0.1 kg. of urea and is filtered about one minute after urea addition in the same manner as given above in connection with the not pretreated portion of yeast cream. The filtered yeast removed from the filter is also shaped to yeast bricks of one half kg. each.

The additions of urea to the remaining third to sixth portions of yeast cream are, respectively, 0.5 kg., 1.0 kg., 2.0 kg., or 5.0 kg. per 100 l. of yeast cream.

The plasticity of said yeast is determined by means of a conventional plasticity measuring apparatus by measuring, after a period of 24 hours, the depth of penetration of a standard indentator weight into yeast bricks shaped and molded under the same conditions.

The dry solid content was determined after storage of the bricks for 24 hours. The results are given in Table I.

TABLE I

| Portion number | Urea added in kg./100 l. of yeast cream | Plasticity (mm.) After 24 hours of storage | Difference in plasticity over portion No. 1 | Dry solid content in percent after 24 hours of storage |
|---|---|---|---|---|
| 1 | 0.0 | 6.00 | 0.00 | 28.8 |
| 2 | 0.1 | 4.86 | 1.14 | 29.0 |
| 3 | 0.5 | 4.21 | 1.79 | 29.7 |
| 4 | 1.0 | 3.21 | 2.79 | 31.0 |
| 5 | 2.0 | 1.79 | 4.21 | 32.8 |
| 6 | 5.0 | 0.87 | 5.13 | 38.2 |

The results of Table I show clearly that the plasticity of the filtered yeast product is very considerably reduced by adding increasing amounts of urea, while its dry solid content is considerably increased.

EXAMPLE 2

6 portions of yeast cream (100 l. each) are processed as given in Example 1 with the modification that, instead of the mentioned amounts of urea, there is added glycerol to the yeast cream portions No. 2 to 6 in amounts of 0.15, 0.75, 1.53, 3.06 or 7.65 kg., respectively. The yeast portions were filtered about one minute after addition of the glycerol. The results are given in Table II.

The amounts of glycerol added to each portion of yeast cream are equivalent in respect to molecular weight and to osmotical efficiency, compared with the amounts of urea in Example 1.

TABLE II

| Portion number | Glycerol added in kg./100 l. of yeast cream | Plasticity (mm.) After 24 hours of storage | Difference in plasticity over portion No. 1 | Dry solid content in percent after 24 hours of storage |
|---|---|---|---|---|
| 1 | 0.00 | 6.00 | 0.00 | 28.8 |
| 2 | 0.15 | 4.99 | 1.01 | 28.9 |
| 3 | 0.75 | 4.30 | 1.70 | 29.6 |
| 4 | 1.53 | 3.26 | 2.74 | 31.0 |
| 5 | 3.06 | 1.81 | 4.19 | 32.8 |

The results of Table II also prove that the glycerol treated yeast when filtered shortly after the addition of glycerol without washing, has a very considerably reduced plasticity and a high dry solid content.

Leavening power and baking strength, leavening permanence, and stability of the yeast, when kept in a thermostat at 35° C., as well as color were quite normal for all yeast bricks.

EXAMPLE 3

The following comparative tests were carried out with a yeast cream containing about 18 kg. of yeast solids per 100 l. of yeast cream.

Test group (a)

(1) 3 portions of yeast cream were mixed with various amounts of urea and were filtered two minutes after addition of the urea on a vacuum rotary drum under a pressure of 700 mm. Hg. The unwashed filtered yeast was removed from the filter drum and yeast bricks of 0.5 kg. were formed.

The dry solids content of said bricks as well as their plasticity were determined after storing for 24 hours.

(2) 3 portions of yeast cream were mixed with various amounts of glycerol and treated as described under (1).

(3) 3 portions of yeast cream were mixed with various amounts of sodium chloride and treated as described under (1).

(4) 1 portion of yeast cream was filtered. Yeast bricks were formed and their dry solids content and plasticity were determined after storing for 24 hours.

Test group (b)

(1) 3 portions of yeast cream were mixed with varying amounts of urea. The mixture was kept for 24 hours and was then filtered and the unwashed filtered yeast was treated and tested as described under (a)(1).

(2) 3 portions of yeast cream were mixed with varying amounts of glycerol. The mixture was kept for 24 hours and was then filtered and the unwashed filtered yeast was treated and tested as described under (a)(1).

(3) 3 portions of yeast cream were mixed with varying amounts of sodium chloride. The mixture was kept for 24 hours and was then filtered and the unwashed filtered yeast was treated and tested as described under (a)(1).

(4) 1 portion of yeast cream was filtered and the filtered yeast bricks were tested as described under (a)(4).

The amounts of urea, glycerol, and sodium chloride were selected so that the osmotic effect of all three osmotically active agents was approximately the same.

The following Table III shows the results achieved on carrying out these tests.

TABLE III

| Test number | Osmotic agent used | Amounts added in kg./100 l. yeast cream | Test group (a) | | | Test group (b) | | |
|---|---|---|---|---|---|---|---|---|
| | | | Dry solids content, percent | Plasticity in mm. penetration | Mm. decrease of penetration (decrease in plasticity) | Dry solids content, percent | Plasticity in mm. penetration | Mm. decrease of penetration (decrease in plasticity) |
| 4 | Control | 0.0 | 27.3 | 6.19 | 0.00 | 27.2 | 6.19 | 0.00 |
| 1 | Urea | 1.1 | 29.4 | 2.95 | 3.24 | 29.3 | 5.89 | 0.30 |
| 1 | do | 2.2 | 31.4 | 1.68 | 4.51 | 31.3 | 5.80 | 0.39 |
| 1 | do | 4.4 | 35.4 | 1.08 | 5.11 | 34.8 | 5.96 | 0.23 |
| 2 | Glycerol | 1.5 | 29.3 | 4.32 | 1.87 | 29.1 | 5.91 | 0.28 |
| 2 | do | 2.9 | 31.1 | 3.01 | 3.18 | 31.0 | 6.01 | 0.18 |
| 2 | do | 5.8 | 35.0 | 1.83 | 4.36 | 35.0 | 5.75 | 0.44 |
| 3 | Sodium chloride | 0.5 | 29.2 | 6.25 | −0.06 | 29.2 | 6.36 | −0.17 |
| 3 | do | 1.0 | 31.2 | 6.50 | −0.31 | 30.9 | 6.40 | −0.21 |
| 3 | do | 2.0 | 35.2 | 6.88 | −0.69 | 35.1 | 6.70 | −0.51 |

It is evident from these tests that only when (a) using urea or glycerol as osmotically active agent, (b) filtering the cream shortly, i.e. 2 minutes after admixture of said agent, and (c) allowing the unwashed filtered yeast to stand for 24 hours, the plasticity is considerably reduced while the dry solids content is substantially the same. Test group (b) shows that immediate filtration is an essential feature of the present invention.

Surprisingly, sodium chloride, when subjected to the process according to the present invention does not produce a reduction in plasticity but even a slight increase.

The curves plotted from these test results and illustrated in FIGS. 1a, 1b, 2a, 2b, 3a, and 3b show more clearly the surprising effect of the process according to the present invention. Of these curves FIG. Ia illustrates the reduction in plasticity caused by the addition of urea and allowing it to act for a short period of time on the yeast cream before filtration, while FIG. Ib illustrates that the plasticity remains substantially unchanged when allowing urea to act, before filtration, for 24 hours on the yeast cream, and is rather high. FIG. IIa illustrates the plasticity values observed on short time action of glycerol on the yeast cream before filtration, while FIG. IIb illustrates the plasticity values observed on long time (24 hours) action of glycerol on the yeast cream before filtration. FIG. IIIa illustrates the plasticity values observed on short time action of sodium chloride on the yeast cream before filtration, and FIG. IIIb the plasticity values on long time (24 hours) action of sodium chloride on the yeast cream before filtration.

The unexpected result achieved by the process of the present invention is clearly evident from these curves.

Comparative tests were also carried out whereby the yeast cream was treated with the osmotically active agents urea, glycerol, and sodium chloride and was filtered without washing immediately after cytorrhysis had taken place but whereby the plasticity was tested in the yeast bricks immediately after filtration and after a storage for 24 hours. These test results are given in the following Table IV.

These tests show that it is a further essential feature of the present invention to allow the filtered yeast to stand for some time so as to permit re-absorption of extracellular water and osmotically active agent into the yeast cells and thus causing a considerable decrease in plasticity while, when not storing the yeast bricks for a prolonged period of time but testing them immediately after filtration, no such decrease in plasticity is observed because the extracellular water had not yet time to be re-absorbed by the yeast cells.

EXAMPLE 4

The following tests were carried out in order to prove that not only short time action of glycerol or urea on the yeast cream before filtration is an essential feature of the present invention as this is shown in Example 3 and FIGS. Ia to IIIb, but also that the filtered, unwashed, treated yeast must be stored after filtration for at least 4 hours in order to effect re-absorption of extracellular water into the cytorrhyzed yeast cells. If the yeast is not stored for a prolonged period of time, but is used within about 3 hours after filtration, the plasticity is not reduced to the optimum extent.

6 batches each of 100 l. of yeast cream were mixed with various amounts of urea or glycerol. There were added to batch 1: 1.1 kg. of urea, to batch 2: 2.2 kg. of urea, to batch 3: 4.4 kg. of urea, to batch 4: 1.5 kg. of glycerol, to batch 5: 2.9 kg. of glycerol, and to batch 6: 5.8 kg. of glycerol.

Two minutes after addition of said amounts of urea or glycerol, the batches were filtered on a rotary drum filter. Bricks of 0.5 kg. each were formed from the filtered yeast. The plasticity of these bricks was tested, as described hereinabove, every hour thereafter. The plasticity values determined thereby for various amounts of the osmotically active agent are given in the following Table V for urea and Table VI for glycerol.

The values given in these tables represent the penetration of the standard indentator weight of a conventional plasticity measuring apparatus.

TABLE IV

| Osmotically active agent | Amount added in kg./100 l. of yeast cream | Test immediately after filtration | | | Tested after storage for 24 hours | | |
|---|---|---|---|---|---|---|---|
| | | Dry solids content, percent | Plasticity, mm. | | Dry solids contents, percent | Plasticity, mm. | |
| | | | Penetration | Decrease of penetration | | Penetration | Decrease of penetration |
| Control | 0.0 | 27.5 | 6.19 | 0.00 | 27.3 | 6.19 | 0.00 |
| Urea | 1.1 | 29.6 | 6.22 | −0.03 | 29.4 | 2.95 | 3.24 |
| Do | 2.2 | 31.5 | 6.28 | −0.09 | 31.4 | 1.68 | 4.51 |
| Do | 4.4 | 35.1 | 6.25 | −0.06 | 35.0 | 1.08 | 5.11 |
| Glycerol | 1.5 | 29.6 | 6.30 | −0.11 | 29.3 | 4.32 | 1.87 |
| Do | 2.9 | 31.3 | 6.35 | −0.61 | 31.1 | 3.01 | 3.18 |
| Do | 5.8 | 35.3 | 6.33 | −0.14 | 35.0 | 1.83 | 4.36 |
| Sodium chloride | 0.5 | 29.5 | 6.24 | −0.05 | 29.2 | 6.25 | −0.06 |
| Do | 1.0 | 31.3 | 6.40 | −0.21 | 31.2 | 6.50 | −0.31 |
| Do | 2.0 | 35.5 | 6.72 | −0.53 | 35.2 | 6.88 | −0.69 |

TABLE V

| Plasticity determined— | Addition of urea to 100 l. of yeast cream | | |
|---|---|---|---|
| | 1.1 kg. | 2.2 kg. | 4.4 kg. |
| Immediately after filtration | 6.3 | 6.3 | 6.3 |
| Hours after filtration: | | | |
| 1 | 4.75 | 3.5 | 2.7 |
| 2 | 3.95 | 2.3 | 1.6 |
| 3 | 3.45 | 1.9 | 1.25 |
| 4 | 3.05 | 1.7 | 1.1 |
| 5 | 2.95 | 1.65 | 1.05 |
| 24 | 2.95 | 1.65 | 1.05 |

TABLE VIII.—COMPARATIVE TESTS

| | According to U.S. patent specification No. 2,947,668 | According to the invention using urea | According to the invention using glycerol |
|---|---|---|---|
| Yeast cream as used | 18.8% yeast dry solid, γ=1.06 | 18.8% yeast dry solid, γ=1.06 | 18.8% yeast dry solid, γ=1.06. |
| Osmotically active compound added to 100 l. yeast cream. | 1.0 kg. NaCl | 2.2 kg. urea | 2.9 kg. glycerol. |
| Surface of the rotary filter | 8 m.² | 8 m.² | 8 m.². |
| Number of revolutions of the filter | 17.5 r.p.m.=1,050 r.p.h.+ | 17.5 r.p.m.=1,050 r.p.h.+ | 17.5 r.p.m.=1,050 r.p.h.+. |
| Dry solid content of the filtered yeast | 31.1% | 31.2% | 31.0%. |
| Amount of the: | | | |
| Filtered yeast | 2,200 kg./h.++ | 2,980 kg./h.++ | 3,050 kg./h.++ |
| Filtered yeast cream | 3,680 kg./h | 5,070 kg./h | 5,170 kg./h. |
| Filtered extracellular water | 1,480 kg./h | 2,090 kg./h | 2,120 kg./h. |
| Wash water | 660 kg./h | 0 | 0. |
| Total filtrate | 2,140 kg./h | 2,090 kg./h | 2,120 kg./h. |
| Thickness of the yeast layer, deposited on the filter. | 0.262 kg./m.² | 0.355 kg./m.² | 0.363 kg./m.² |
| Amount of osmotically active compound in the filtered yeast. | 0.02 kg. NaCl/100 kg. yeast having a yeast dry solid content of 31.1%=0.064 kg. NaCl by 100 kg. yeast dry solid. | 0.77 kg. urea/100 kg. yeast having a yeast dry solid content of 31.2%=2.5 kg. urea by 100 kg. yeast dry solid. | 1.0 kg. glycerol/100 kg. yeast having a yeast dry solid content of 31.0%=3.3 kg. glycerol by 100 kg. yeast dry solid. |

+Rotation per hour. ++Kg. per hour.

TABLE VI

| Plasticity determined— | Addition of glycerol per 100 l. of yeast cream | | |
|---|---|---|---|
| | 1.5 kg. | 2.9 kg. | 5.8 kg. |
| Immediately after filtration | 6.3 | 6.3 | 6.3 |
| Hours after filtration: | | | |
| 1 | 5.85 | 5.0 | 3.5 |
| 2 | 5.3 | 4.3 | 2.65 |
| 3 | 5.15 | 3.8 | 2.3 |
| 4 | 4.8 | 3.5 | 2.05 |
| 5 | 4.55 | 3.25 | 2.0 |
| 6 | 4.45 | 3.05 | 1.95 |
| 7 | 4.35 | 3.1 | 1.85 |
| 8 | 4.35 | 3.05 | 1.85 |
| 9 | 4.35 | 3.0 | 1.8 |
| 24 | 4.35 | 3.0 | 1.85 |

Figure 1A:
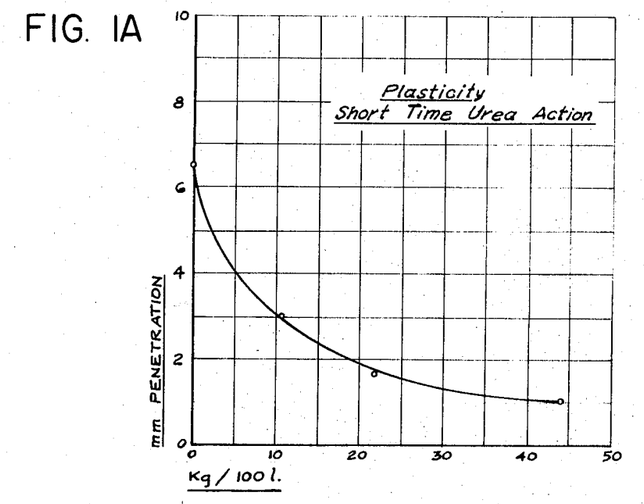
Figure 1B:
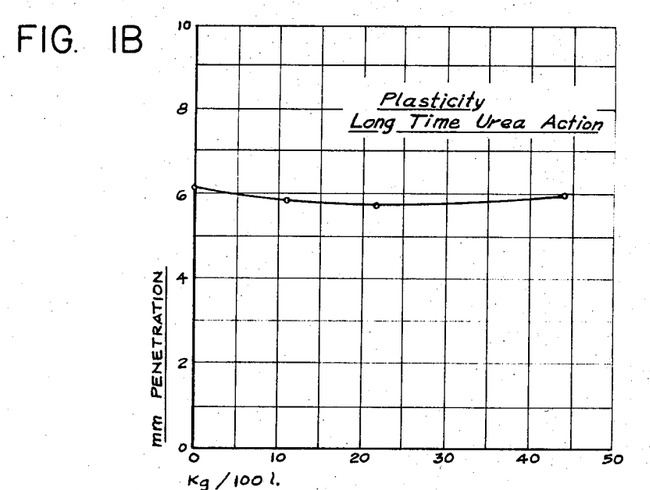
Figure 2A:
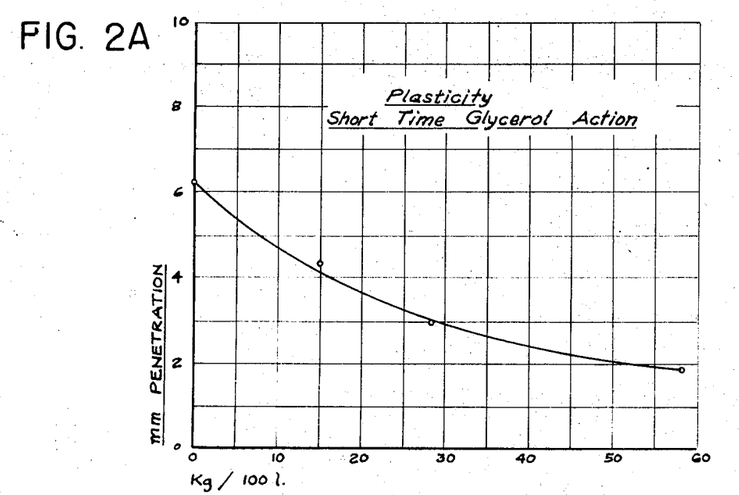
Figure 2B:
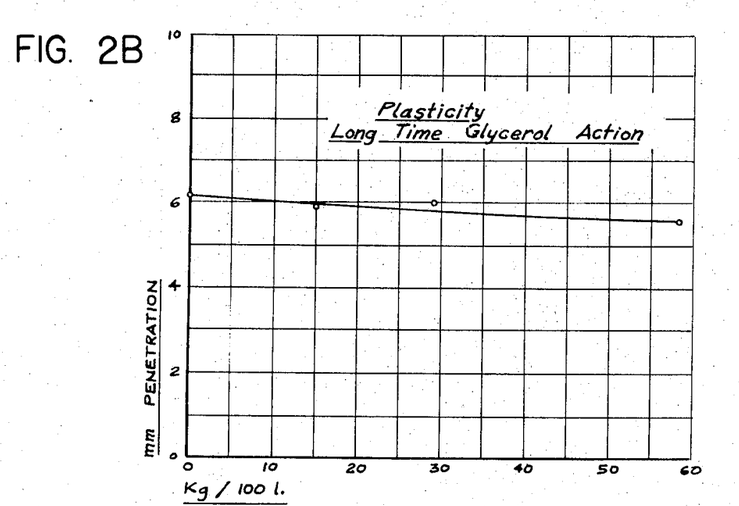
Figure 3A:
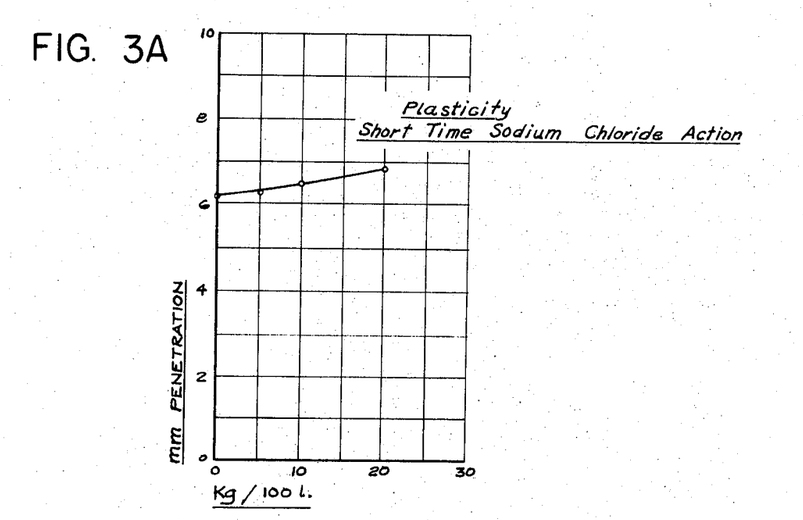
Figure 3B:
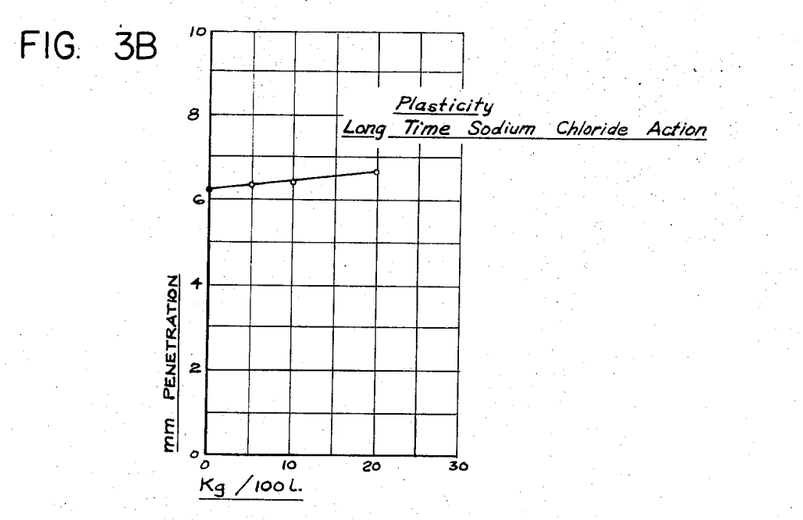
Figure 4:
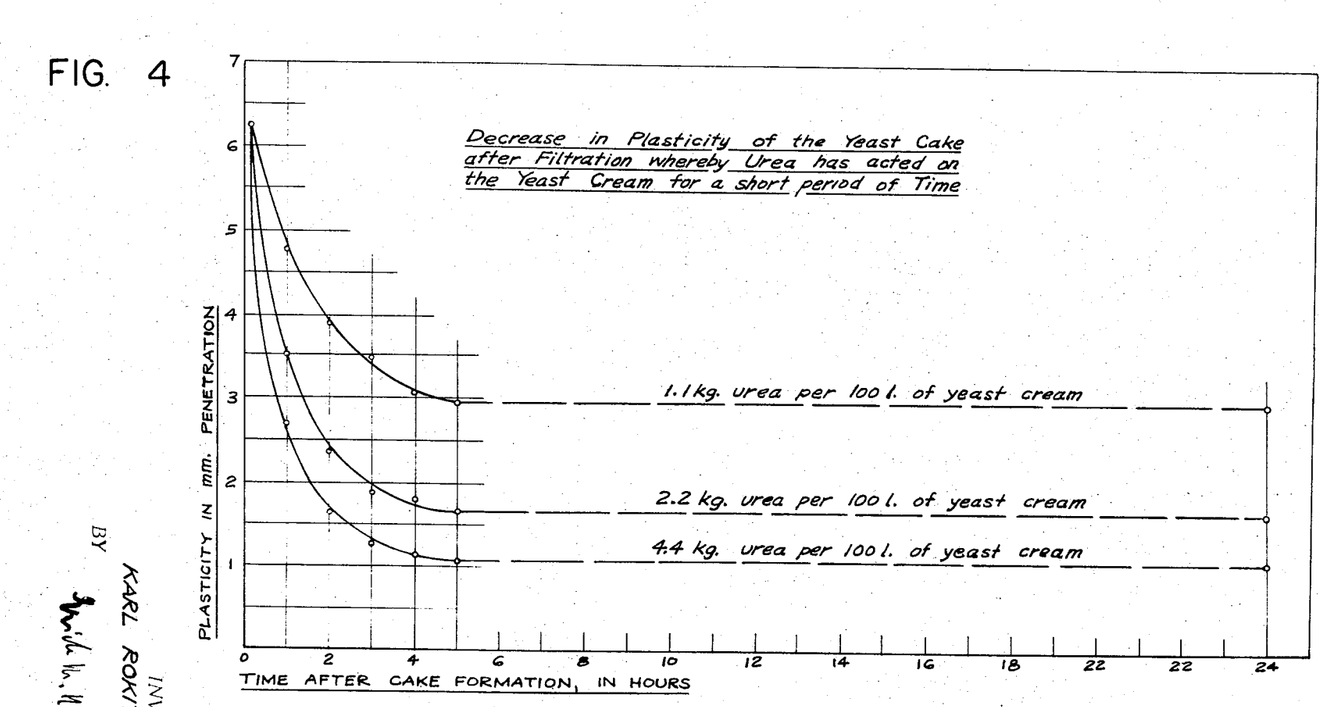
Figure 5:
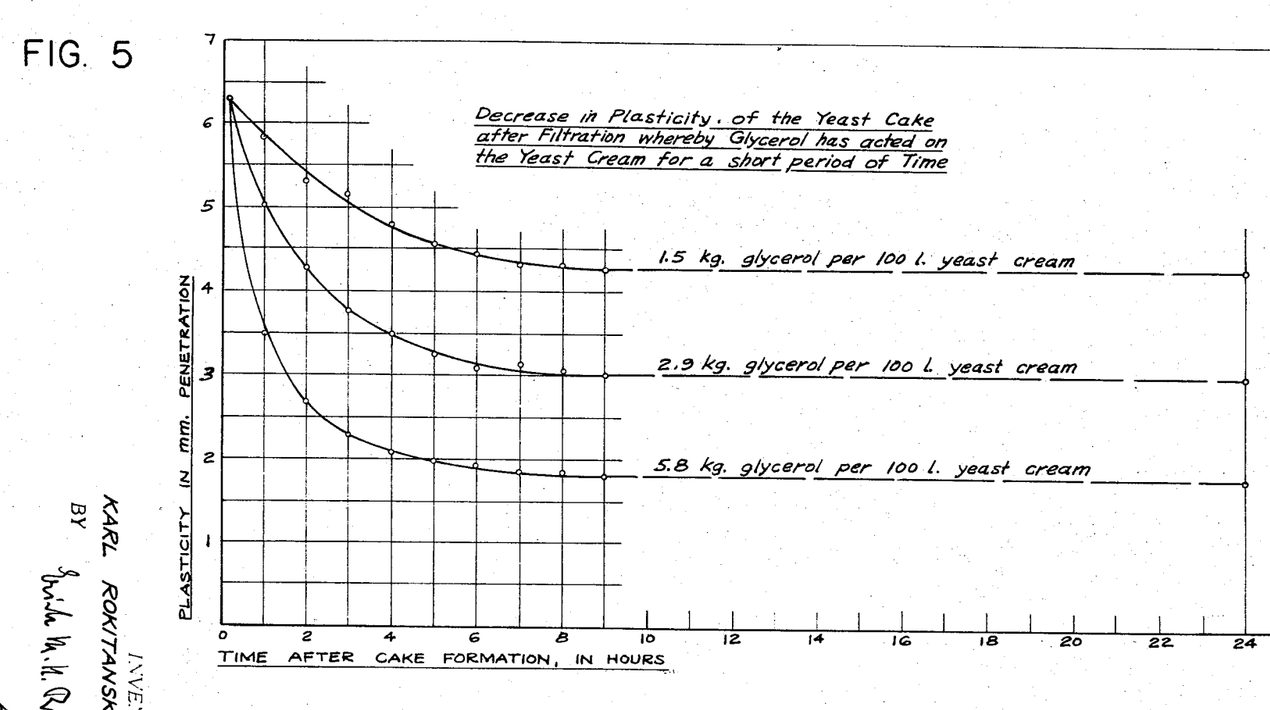

These test results clearly show that with urea the lowest plasticity value is obtained after allowing the filtered but unwashed yeast to stand for at least 4 to 5 hours and, with glycerol, for at least 6 to 7 hours. The attached FIGS. IV and V clearly illustrate the decrease in plasticity of the filtered but unwashed yeast on storing and the storage time at which no further decrease in plasticity is observed.

EXAMPLE 5

The leavening power of filtered yeast produced according to the present invention was determined and compared with the leavening power of a filtered yeast produced without addition of osmotically active compounds. The three yeast samples were tested for their leavening power and the dough leavening times in minutes found in said tests are given in Table VII.

TABLE VII

| | | Leavening time | | | |
|---|---|---|---|---|---|
| Test No. | Sample | 1st test | 2d test | 3d test | Total |
| 1 | Control | 49 | 33 | 28 | 110 |
| 2 | 4.4 kg. of urea/100 l. of yeast cream. | 50 | 29 | 26 | 105 |
| 3 | 5.8 kg. of glycerol/100 l. of yeast cream. | 44 | 27 | 25 | 96 |

It is evident that the samples 2 and 3 of unwashed filtered yeast according to the present invention show even shorter leavening times, i.e. a higher leavening power than the sample 1. The glycerol yeast is slightly superior to the urea yeast. No difference in taste could be found between the control and the glycerol yeast while the urea yeast tasted slightly stronger but not at all disagreeable. It may be mentioned that glycerol and urea in the concentrations present in the unwashed filtered yeast are harmless and not objectionable in nitritional-physiological respect.

EXAMPLE 6

The following tests were carried out to demonstrate the increased yeast output per hour obtained with the process according to the invention:

The conventional plasticity measuring apparatus as used is described by Hermann Krestchmar, "Hefe und Alcohol sowie andere Gärungsprodukte," Springer-Verlag, Berlin/Göttingen/Heidelberg, 1955, pages 549–550.

I claim:

1. In a process of producing yeast of increased dry solid content, low plasticity, and high stability, said process consisting in admixing to a yeast suspension an osmotically active compound, allowing said osmotically compound to act on the yeast, and filtering or centrifuging the cytorrhyzed yeast cells to remove therefrom exuded intracellular water and excess extracellular water, the improvement which consists in
   (a) using urea or glycerol as osmotically active compound;
   (b) allowing said urea or glycerol to act on the yeast for a period of time between about 5 seconds and about 2 minutes to cause exudation of intracellular water from and cytorrhysis of the yeast cells;
   (c) filtering or centrifuging the cytorrhyzed yeast cells immediately thereafter; and
   (d) thereupon storing the filtered or centrifuged yeast before use for at least four hours to cause re-absorption of extracellular water and the osmotically active compound present in said extracellular water and reduction in plasticity without changing its solid content.

2. The process according to claim 1, wherein the filtered or centrifuged yeast is stored for about 24 hours before use.

3. The process according to claim 1, wherein the osmotically active compound is added to relatively small increments of the yeast suspension.

4. The process according to claim 1, wherein the yeast suspension is yeast cream.

5. The process according to claim 1, wherein the osmotically active compound is added to the yeast suspension in an amount between about 0.1% and about 6.0%, by weight, to 100 l. of yeast suspension.

6. The process according to claim 1, wherein the osmotically active compound is added to the yeast suspension in an amount between about 0.3% and about 3%, by weight, to 100 l. of yeast suspension.

7. The process according to claim 1, wherein a preconcentrated yeast suspension of a low content of extracellular water removable by filtration is used as starting material.

References Cited

UNITED STATES PATENTS 2,947,668   8/1960   Kuestler _____________ 99—96

ALVIN E. TANENHOLTZ, Primary Examiner

U.S. Cl. X.R.

99—96

PO-1050
(5/69)

UNITED STATES PATENT OFFICE
CERTIFICATE OF CORRECTION

Patent No. 3,681,199                    Dated August 1, 1972

Inventor(s) KARL ROKITANSKY

It is certified that error appears in the above-identified patent and that said Letters Patent are hereby corrected as shown below:

Column 2, line 52: "filter" should read -- filtered --; column 2, line 53: "onmotically" should read --osmotically--; column 2, line 58: "extra cellular" should read --extracellular--; column 2, line 61: "mashing" should read -- washing --; column 5, line 15: "osmitically" should read -- osmotically --; column 12, line 8: "nitritional" should read -- nutritional --; column 12, line 38: "Krestchmar" should read -- Kretschmar --.

Signed and sealed this 26th day of December 1972.

(SEAL)
Attest:

EDWARD M. FLETCHER, JR.
Attesting Officer

ROBERT GOTTSCHALK
Commissioner of Patents